Jan. 30, 1962
P. E. GIES ETAL
3,018,854
FLUTTER DAMPER
Filed March 26, 1959
2 Sheets-Sheet 1
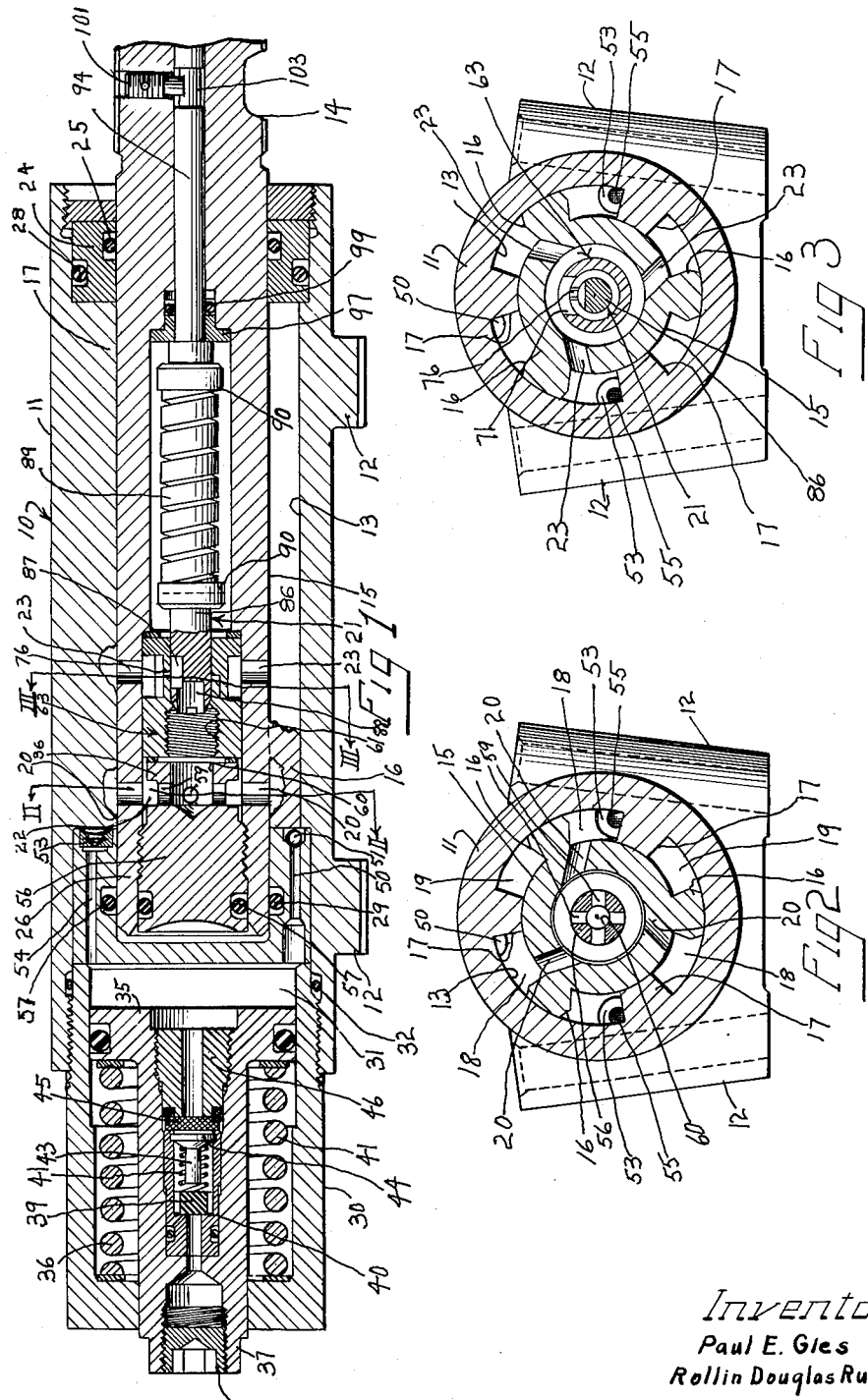
Inventors
Paul E. Gies
Rollin Douglas Rumsey
by Hill, Sherman, Meroni, Gross + Simpson Attys.

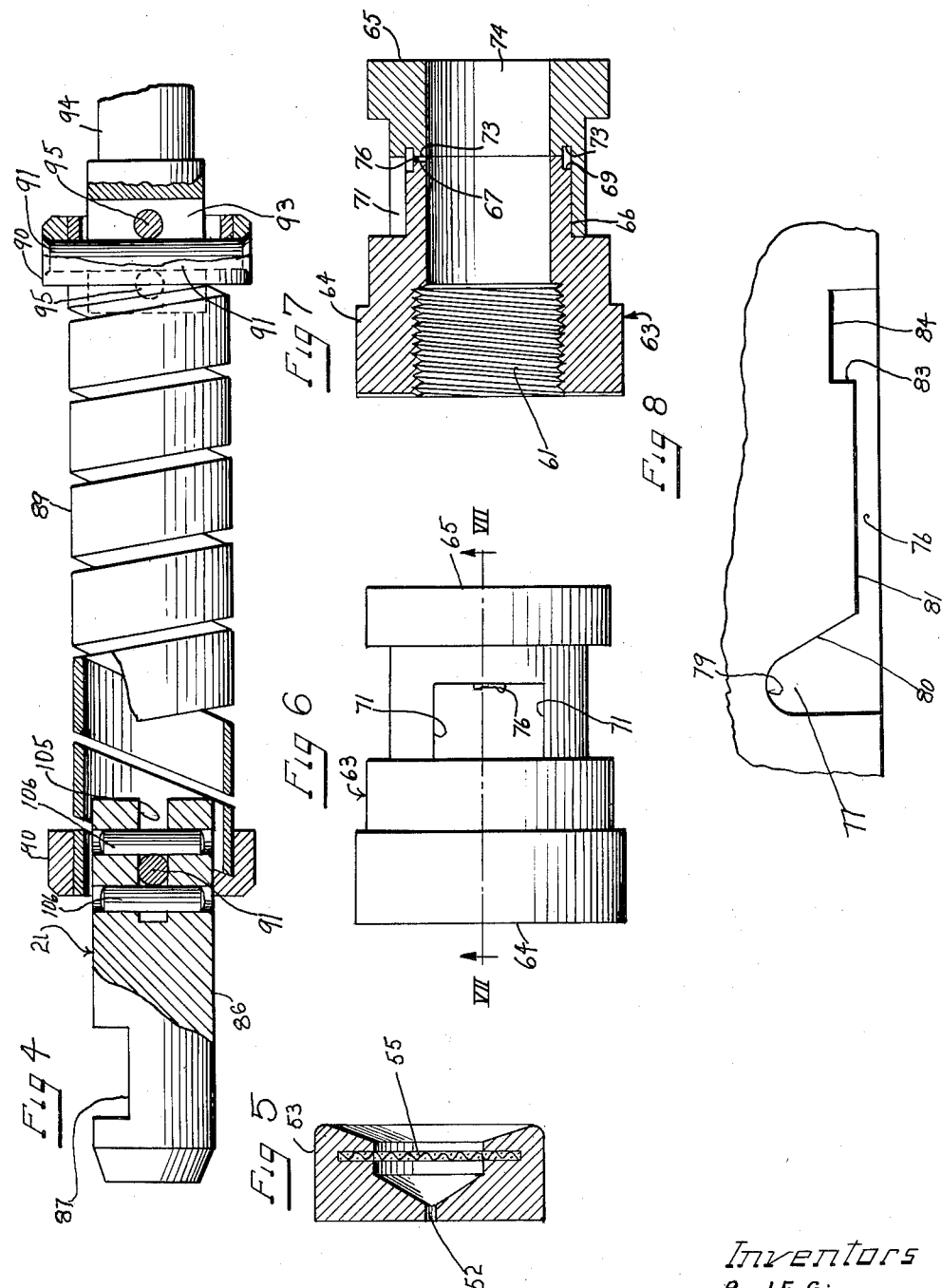

United States Patent Office 3,018,854
Patented Jan. 30, 1962

3,018,854
FLUTTER DAMPER
Paul E. Gies and Rollin Douglas Rumsey, Buffalo, N.Y.,
assignors to Houdaille Industries, Inc., Buffalo, N.Y.,
a corporation of Michigan
Filed Mar. 26, 1959, Ser. No. 802,135
8 Claims. (Cl. 188—93)

This invention relates to improvements in dampers and more particularly relates to an improved damper for damping flutter of the adjustable air foil members of aircraft.

A principal object of the invention is to provide a flutter damper in which the orifice affording communication between the working chambers of the damper is so constructed and arranged as to adhere to certain critical relationships and to provide a substantially uniform damping effect over a wide range of temperature variations.

Another object of the invention is to prvoide an improved form of flutter damper in which a uniform damping action is attained over wide temperature ranges by providing a damping orifice in the form of a slot of larger cross-sectional area adjacent one end thereof than the other, and by varying the cross-sectional area of the orifice as the temperature changes, to first close off the lareg area end of the slot upon increases in temperature. A still further object of the invention is to provide an improved form of rotary damper for damping the flutter of the air foil sections of aircraft and the like, in which the damping orifice between the working chambers of the damper is in the form of a slot the cross-sectional area of which is controlled by a temperature compensating rotatable orifice control valve, and in which the slot is wider at its ends than intermediate its ends, and is wider at one end than the other, and in which the orifice control valve moves to close off the widest end of the slot upon increases in temperature and to open up the slot upon decreases in temperature, and to maintain the slot wide open upon excessive low temperature conditions, to provide a substantially uniform damping effect over the wide range of temperature variations.

A still further object of the invention is to provide an improved from of rotary flutter damper, for damping the flutter of the movable air foil sections of aircraft and the like, arranged with a view toward greater temperature control accuracy, in which the accuracy of the temperature control is attained by rotatably moving the orifice control valve as the temperature changes by a bi-metal coil, and in which the connections from the coil to the orifice control valve and to a stationary connecting member for the coil are in the form of two universal joints, eliminating all possibility of binding between the coil and the orfiice control valve.

Still another object of the invention is to provide a simplified and improved form of flutter damper for damping the flutter of the air foil sections of aircraft, so arranged as to efficiently operate on either the right or left hand side of the aircraft.

A still further object of the invention is to provide a rotary flutter damper having two oppositely disposed air vents, so arranged that when the damper is mounted on the air foil section of a plane, either of the air vents will be located at the highest point of the working chamber of the damper.

These and other objects of the invention will appear from time to time as the following specification proceeds and with reference to the accompanying drawings wherein:

FIGURE 1 is a schematic longitudinal sectional view taken through a rotary damper structure constructed in accordance with the invention;

FIGURE 2 is a transverse sectional view taken substantially along line II—II of FIGURE 1;

FIGURE 3 is a transverse sectional view taken substantially along line III—III of FIGURE 1;

FIGURE 4 is an enlarged detail view of the rotary orifice control valve with certain parts broken away and shown in section in order to illustrate the universal connections between the temperature responsive device and the valve;

FIGURE 5 is a detail transverse sectional view taken through the fitting containing the air bleed orifice and screen;

FIGURE 6 is an enlarged plan view of the orifice spool illustrating the orifice slot therein;

FIGURE 7 is a cross-sectional view taken substantially along line VII—VII of FIGURE 6; and FIGURE 8 is a view showing the development of the damping orifice shown in FIGURE 6.

In the embodiment of the invention illustrated in the drawings, reference character 10 designates generally a flutter damper constructed in accordance with the principles of the invention and capable of being contained in free working relation within the joint portion of a movable control surface member of an airplane air foil assembly, such as an elevator, stabilizer or the like, to damp the tendency of the air foil assembly to flutter.

The flutter damper 10 is shown as being a rotary vane hydraulic piston type of damper comprising an elongated housing or envelope 11, which may be mounted coaxially with the hinge axis of a pivoted air foil member (not shown), and which may be attached thereto by means of attachment flanges 12, 12 extending laterally from the upper and lower sides thereof.

The housing or envelope 11 has an interior cylindrical wall portion 13 having a rotary piston 15 carried therein and projecting from one end thereof.

The housing 11 may be rigidly secured to the movable control member of the airplane for rocking movement about the axis of movement of the control member as the latter swings or tends to flutter, while a projecting end 14 of the piston 15 may be secured to a stationary part of the airplane.

The rotary piston 15, commonly called a wing shaft, is shown in FIGURES 2 and 3 as being provided with three laterally projecting vanes or wings 16, extending therealong for substantially the length of the cylindrical wall 13 and having slidable engagement therewith. Extending inwardly of the cylindrical wall 13 and spaced between the vanes 16 are reaction members or dividers 17, slidably engageable with the rotary piston 15 between the wings 16 thereof. The dividers 17 cooperating with the wings or vanes 16 divide the interior of the housing 11 into a plurality of opposed working chambers 18 and 19.

Hydraulic fluid under pressure is displaced from the working chambers 18 to the working chambers 19 through fluid displacement ports 20 leading to a hollow interior portion 22 of the rotary piston 15, through a fluid displacement orifice control valve 21, and through fluid displacement ports 23 leading from the hollow interior portion 22 of the piston 15 to the working chambers 19, as will hereinafter more clearly appear as this specification proceeds.

The end of the housing 11 adjacent the projecting end portion of the wing shaft or rotary piston 15 has a bearing member 24 recessed therein, sealed to the housing and wing shaft 15 by an O-ring seal 25 having sealing engagement with the wing shaft, and sealed to the interior of the housing 11 by an O-ring seal 28.

The end of the rotary piston 15 opposite the projecting end portion 14 is rotatably mounted within a cup-like plug 26, recessed within the housing 11 and press fitted therein. An O-ring seal 27, carried in an interior wall 29 of the plug 26, engages the periphery of the inner end portion of the rotary piston or wing shaft 15, and forms a seal therefor.

Abutting the outer end of the plug 26 and threaded within the opposite end of the housing 11 from the projecting end of the rotary piston 15 is a cup-like generally cylindrical member 30, the interior of which forms a fluid replenishing chamber 31. The cup-like member 30 is sealed to the inner wall of the housing 11 by an O-ring seal 32. The fluid replenishing chamber 31 is shown as having a piston 35 therein, biased toward the inner end of said chamber by a compression spring 36 seated at one end on said piston, and at its opposite end in the end wall of the cup-like member 30. The piston 35 has a hollow piston rod 37 projecting outwardly therefrom, and slidably guided in the end wall of the cup-like member 30 and projecting outwardly beyond said cup-like member. As herein shown, a check valve 39 is provided within a generally cylindrical valve body 40 mounted within the hollow interior of the piston rod 37. A spring 41 extending about a stem 43 of a spider 44, seated in the inner end of the body 40, is provided to bias the check valve 39 in position to accommodate the flow of fluid under pressure into the replenishing chamber 31, and to block the back flow of fluid from said replenishing chamber.

A screen 45 abuts the inner end of the check valve body 40 and is retained in position by a passageway member or hollow plug 46, threaded within the piston 35 and hollow piston rod 37 and suitably sealed thereto.

A closure plug 49 is threaded in the outer end portion of the piston rod 37 and is removable to accommodate a fitting on the end of a pressure line to be threaded therein, to fill the replenishing chamber 31 with hydraulic fluid under pressure, the fluid moving the piston 35 outwardly along the chamber against the spring 36 during filling thereof. The spring 36 biases the piston 35 inwardly along the chamber 31 and provides the pressure to replenish hydraulic fluid in the damping chamber through a fluid replenishing passageway 50 leading axially through the plug 26. A ball type check valve 51 is provided at the inner end of the passageway 50 to prevent the back flow of hydraulic fluid from the damping chamber to the fluid replenishing chamber 31.

The check valve 51 is retained in position by an abutment 17, shown in FIGURE 2 as extending partially over the inner open end portion of the passageway 50.

In order to bleed the damping chamber free from air, spaced air bleed vents 52 lead through the bottoms of filter retainers 53 to the replenishing chamber 31. The filter retainers 53 are seated in the annular inner end wall of the cup-like plug 26, and spaced at opposite sides of said plug 180° apart, as shown in FIGURES 2 and 3. The air vents 52 are in axial alignment with passageways 54 leading axially through the wall of the plug 26 and are spaced at opposite sides of said plug 26 to enable the damper to be used on either a right or a left hand wing, and to provide automatic air bleed for the damper when mounted in either wing of the aircraft. The damper is, therefore, operative with either side up and when mounted in the wing of the aircraft, one or the other air bleed vents 53 will be located at the highest point of the working chamber of the damper.

It is understood that during operation of the damper, that a minute amount of damping fluid will be continuously pumped through the air vent and to the replenishing chamber 31 and that a like amount of fluid will be returned to the damping chambers through the replenishing check valve 51. The air bleed vents 52 are approximately .003 inch in diameter in order to prevent loss of strength of the damper. The entering ends of the air bleed vents 52 are covered by filter screens 55 mounted in the retainers 53 at the entering ends thereof to filter foreign matter from the hydraulic fluid and to prevent clogging of said air vents.

Referring now to the orifice control valve 21, controlling the passage of damping fluid from the chambers of decreasing volume to the chambers of increasing volume, the inner end of the rotary piston 15 is closed by a plug 56, threaded within said rotary piston and sealed thereto as by an O-ring 57.

The inner end portion of the plug 56 has cross-drilled passageways 59 in communication with the fluid displacement ports 20 and communicating with an axial passageway 60 opening to the inner end of the plug 56 and having communication with a hollow interior portion 61 of an orifice spool 63.

The orifice spool 63 includes an outer end portion or half 64 and an inner end portion or half 65 in alignment with the half 64 and having interengagement therewith.

The half 64 of the orifice spool 63 is shown in FIGURE 7 as having a reduced diameter portion 66 having a front face 67. The front face 67 has an outer undercut portion 69 extending about the outer periphery thereof and providing a sharp edge along the outer periphery of said front face.

The half 65 of the orifice spool 63 has a reduced diameter portion 70 having a slot 71 leading thereinto from the upper side thereof to an inner face 73, encircling an axial passageway 74 leading through the half 65. The interior of the reduced diameter portion 70 fits over the reduced diameter portion 66 of the half 64. The face 73 has a right angled undercut portion 75 extending about the periphery thereof and forming a sharp corner about the outer periphery of the face 73. A sharp corner is formed about the inner periphery of said face by the passageway 74.

The front face 67 of the half 64 of the orifice spool 63 has a slot 76 formed therein and opening toward the face 73 of the half 65. The slot 76 is shown in FIGURE 6 and in the development in FIGURE 9 as having a relatively deep portion 77 at the left hand end thereof having a rounded inner corner 79 terminating into a sloping face 80 extending tangentially of said rounded corner and angularly outwardly with respect thereto. The sloping face 80 in turn terminates at a plane face 81, extending parallel to the face 73 of the half 65 of the orifice spool 63. The face 81 extends for a greater part of the length of the slot 76 and terminates into an abrupt shoulder 83, extending inwardly of the face 81, at right angles with respect thereto. The shoulder 83 in turn terminates into a face 84 extending parallel to the face 81 and spaced inwardly therefrom and extending to the right hand end of the slot 76 and forming a recessed end portion of less width than the left hand end portion 77 of the slot 76.

The orifice control valve 21 is shown in FIGURES 1 and 4, as being a rotatable plug 86 rotatably mounted within the spool 63 and having a chordal slot 87 extending thereacross in registry with the orifice slot 76. The slot 87 is shown in FIGURE 1 as opening to a passageway 88, opening into the hollow interior portion 61 of the orifice spool 63 and communicating with the ports 59.

The annular space between the halves 64 and 65 of the orifice spool 63 is shown in FIGURE 1 as having communication with the displacement ports 23. The valve spool 86 is rotatably moved within the orifice spool 63 upon changes in temperature by means of a spiral bimetallic thermostatic element 89. The thermostatic element 89 has a collar 90 at each end thereof, each collar 90 has a pin 91 extending thereacross.

The pins 91 on the forward and rear collars 90 extend at right angles with respect to each other. The pin 91 on the rear or outer collar 90 is shown as extending through an inwardly opening slot 93 formed on the inner end portion of an adjustment rod 94 rotatably mounted within the rotary piston 15 to calibrate the valve 21, and held stationary when said valve is in adjustment. The slot 93 has spaced pins 95 extending therethrough on opposite sides of the pin 91, and with the pin 91 forming a universal connection connecting the adjustment rod 94 with the rear collar 90. The pin 91 extending through the inner collar 90 of the thermostatic element 89 extends through a slot 105 formed in the plug valve 86 and opening to the opposite end of said plug valve from the chordal slot 87. Spaced bearing pins 106 extend through the slot 105 on opposite sides of the pin 91 and form a bearing therefor, providing a universal connection from the inner collar 90 to the plug valve 86. It should here be noted that since the forward and rear pins 91 are at right angles with respect to each other, that half universal connections are provided at each end of the thermostatic element 89, and that these universal connections enable the thermostatic element 89 to rotatably move the plug valve 86 within the orifice spool 63 without binding, even if there should be a misalignment between the axis of adjustment rod 94 and the axis of rotation of the plug valve 86. The plug valve 86 is rotatably fitted within the orifice spool 63 to be rotatably moved therein with a minimum of friction so as to provide extreme accuracy in the control of the orifice slot 76 over a wide range of temperature variations.

The adjustment rod 94 is rotatably mounted within the rotary piston 15 and extends through a flanged collar 97 mounted in the interior portion of the rotary piston 15. An O-ring seal 99, abutting the inner end of the flanged collar 97 and encircling the adjustment rod 94, is provided to seal the hollow interior portion of the rotary piston 15 around the adjustment rod 94. The adjustment rod 94 has a slotted outer end portion (not shown) accessible from the outer end of the rotary piston 15, and affording a means for turning the adjustment shaft 94 and the plug valve 86 through the spiral thermostatic element 89, to calibrate the plug valve 86 with respect to the orifice slot 76 and accommodate said plug valve to close off said slot upon predetermined excessive upper temperature ranges and to open said slot wide upon predetermined excessive low temperature ranges. A set screw 101 is threaded within the outwardly extending shaft portion of the wing shaft 15 and has engagement with a recessed portion 103 of the rod 94 to retain the rod 94 in adjustment.

It should here be understood that when the plug valve 86 is once calibrated for the required operating conditions that the plug valve is then locked into its calibrated position.

It should here to understood that at extremely high temperature conditions, as for example, at temperatures of 110° F. and higher, that it is desirable to have the damper as strong as possible. Also at extreme low temperature conditions, as for example, temperatures below 65° F. below zero, it is impossible to have a damper which is weak enough, due to the viscosity of the damping fluid at these temperatures. At excessively low temperature conditions, the orifice 76 must, therefore, be open as far as possible.

The valve spool 86 of the orifice control valve 21 is thus so calibrated that at temperatures of a 110° and higher, the orifice 76 is closed. As the temperature decreases from 110° down to room temperature or 75°, the slot will be opened along the face 84 and along the face 81 giving a width of slot from the face 81 of the half 64 to the face 73 of the half 65. This width of slot will be held to substantially 20° F. above zero. As the temperature drops below 20° F. above zero the valve plug 86 will continue to rotate and the slot 76 will diverge along the angular face 80 until a wide open condition of the slot is reached which will be at temperatures of substantially 20° F. below zero and lower.

It should further be noted that the inner edge of the axial passageway 74 leading through the half 65 of the orifice spool 63 provides a sharp corner along the orifice 76. The right angled under-cut portion 75 of the half 65 of the orifice spool 63 also provides a sharp corner along the outer side of the orifice 76. The inner edge of the axial passageway leading through the half 64 is also a sharp corner and provides a sharp edge along the inner side of the orifice 76. The under-cut portion 69 of the half 64 provides a sharp edge along the outer side of the orifice 76. The edges of the orifice 76 in each direction of flow through said orifice are thus sharp edges or corners, resulting in an increase in the accuracy in the restriction of flow through the orifice in each direction of flow of the damping fluid and an increase in the consistency in strength of the damper in both directions of operation thereof.

While we have herein shown and described one form in which our invention may be embodied, it should be understood that various modifications and variations in the invention may be effected without departing from the spirit and scope of the invention as defined by the claims appended hereto.

We claim as our invention:

1. In a mechanical flutter damper for damping high frequency airfoil vibration, an elongated housing having an inner wall defining a damping chamber normally filled with hydraulic fluid, a rotary piston rotatably mounted within said damping chamber and cooperating therewith to form a plurality of working chambers therein, an orifice spool mounted within said rotary piston and having an orifice slot leading therethrough and opening to the periphery thereof and affording communication between said damping chambers, an orifice control valve rotatably mounted within said orifice spool and cooperating with said orifice slot to vary the cross-sectional area thereof under varying temperature conditions, said orifice slot being a sharp edged slot of varying cross-sectional area throughout the length thereof, and said orifice control valve cooperating with said slot to progressively open and increase the cross-sectional area of said slot throughout a temperature range from a closed position at predetermined maximum high temperature conditions to a wide open position at predetermined low temperature conditions, and to maintain said slot in its wide open position throughout the predetermined low temperature conditions.

2. In a mechanical flutter damper for damping high frequency airfoil vibration, an elongated housing having an inner wall defining a damping chamber and normally filled with hydraulic fluid, a rotary piston within said damping chamber and cooperating therewith to form a plurality of working chambers, an orifice spool within said rotary piston and having an orifice slot therein affording communication between said working chambers, an orifice control valve rotatably mounted within said spool, temperature compensating means for rotatably moving said orifice control valve to vary the cross-sectional area of said slot over a wide range of temperature variations, said slot being machined to match variations in viscosity characteristics of the damping fluid and forming an orifice extending transversely of said orifice spool, one end portion of said slot being wider than the other end portion thereof, and an intermediate portion of said slot being narrower than the opposite end portions thereof, the edges of said slot being sharp to define a sharp edged orifice, said temperature compensating means moving said orifice control valve from a position closing off said slot at high temperature ranges, to first open up the narrower end portion of said slot upon increases in temperature and maintain said slot at a substantially constant width over an intermediate temperature range and opening said slot wide open over a predetermined low temperature range.

3. In a damper for damping flutter and the like, an elongated housing having an inner cylindrical wall normally filled with hydraulic fluid, a rotary piston within said housing having oppositely extending vanes slidably engageable with said cylindrical wall, abutments extending inwardly of said cylindrical wall and cooperating with said vanes to form a plurality of working chambers, displacement ports in said piston leading from said working chambers to the hollow interior of said piston, a spool within the hollow interior of said piston having an elongated orifice therein of varying cross-sectional area throughout the length thereof and affording communication between said working chambers through said displacement ports, an orifice control valve rotatably mounted within said spool, temperature compensating means for rotatably moving said orifice control valve to vary the cross-sectional area of said orifice slot upon varying temperature conditions comprising a bi-metal coil, a normally stationary rod, and universal connecting means connecting said rod to said coil and said coil to said valve comprising pivot pins at each end of said coil extending at right angles with respect to each other, and spaced pivot pins on said rod and said valve extending along opposite sides of said first mentioned pivot pins and accommodating universal movement of said valve with respect to said rod.

4. A damper in accordance with claim 3, in which the rod is rotatably mounted with respect to said piston to calibrate said orifice control valve and in which means are provided to lock said rod from rotation.

5. In a mechanical flutter damper, a housing having an inner cylindrical wall, an abutment extending inwardly of said cylindrical wall, a rotary piston within said housing having a sliding vane slidably engageable with said cylindrical wall and cooperating with said abutment to define a plurality of varying volume damping chambers, fluid displacement ports in said piston affording communication between said damping chambers and damping orifice means in communication with said fluid displacement ports, said housing having opposite end walls and diametrically opposed air vent holes leading through at least one of said end walls, one air vent hole being at the high part of said housing and the other air vent hole being at the low part of said housing when said damper is mounted on an air-craft, and thereby accommodating said damper for either right or left hand operation.

6. A damper in accordance with claim 5 in which attachment flanges extend from opposite sides of said damper housing, and in which the air vent holes are adjacent said attachment flanges.

7. A damper in accordance with claim 5 in which screen filters extend over said air vent holes.

8. A damper in accordance with claim 5, in which filter retainers are mounted in said end wall and have said air vent holes leading therethrough, and in which screen filters are mounted in said filter retainers.

References Cited in the file of this patent

UNITED STATES PATENTS

| | | |
|---|---|---|
| 1,876,552 | Beecher | Sept. 17, 1932 |
| 1,923,128 | Ullery | Aug. 22, 1933 |
| 2,004,752 | Fox et al. | June 11, 1935 |
| 2,025,423 | Robbins | Dec. 24, 1935 |
| 2,037,820 | Peo | Apr. 21, 1936 |
| 2,347,803 | Allen et al. | May 2, 1944 |
| 2,758,679 | O'Connor et al. | Aug. 14, 1956 |
| 2,797,776 | Beyer et al. | July 2, 1957 |
| 2,807,336 | Sweeney | Sept. 24, 1957 |
| 2,811,227 | O'Connor | Oct. 29, 1957 |